UNITED STATES PATENT OFFICE.

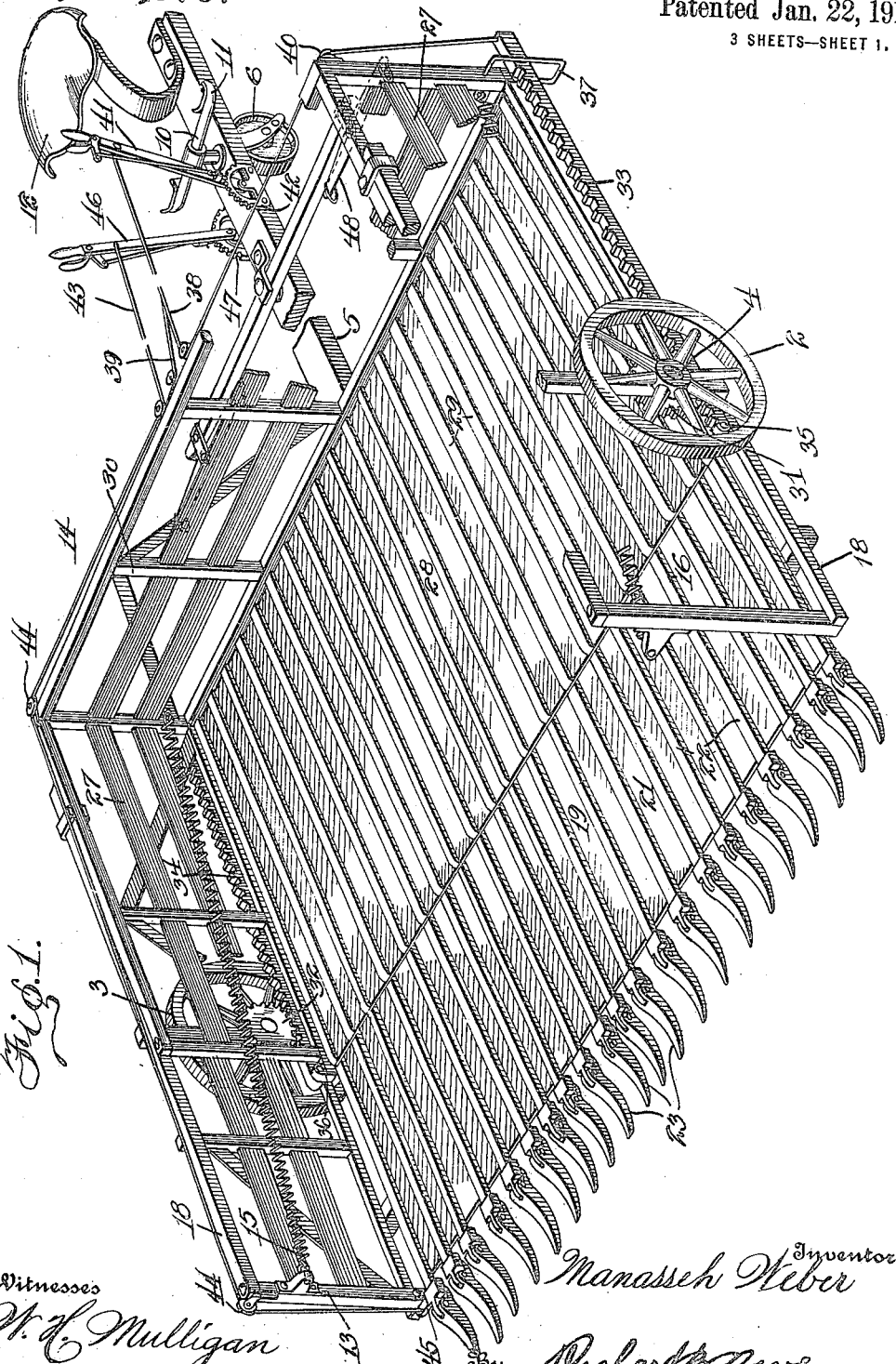

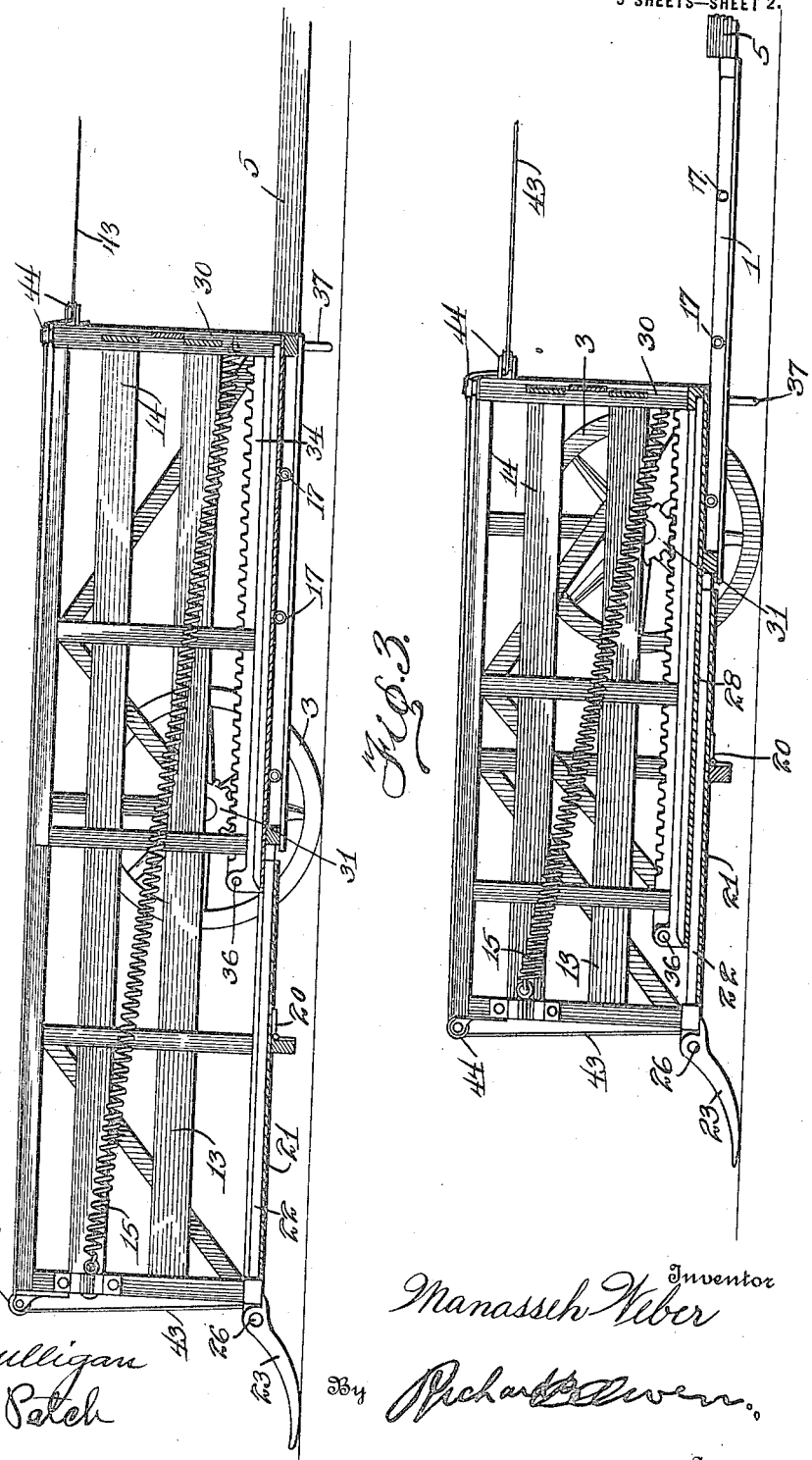

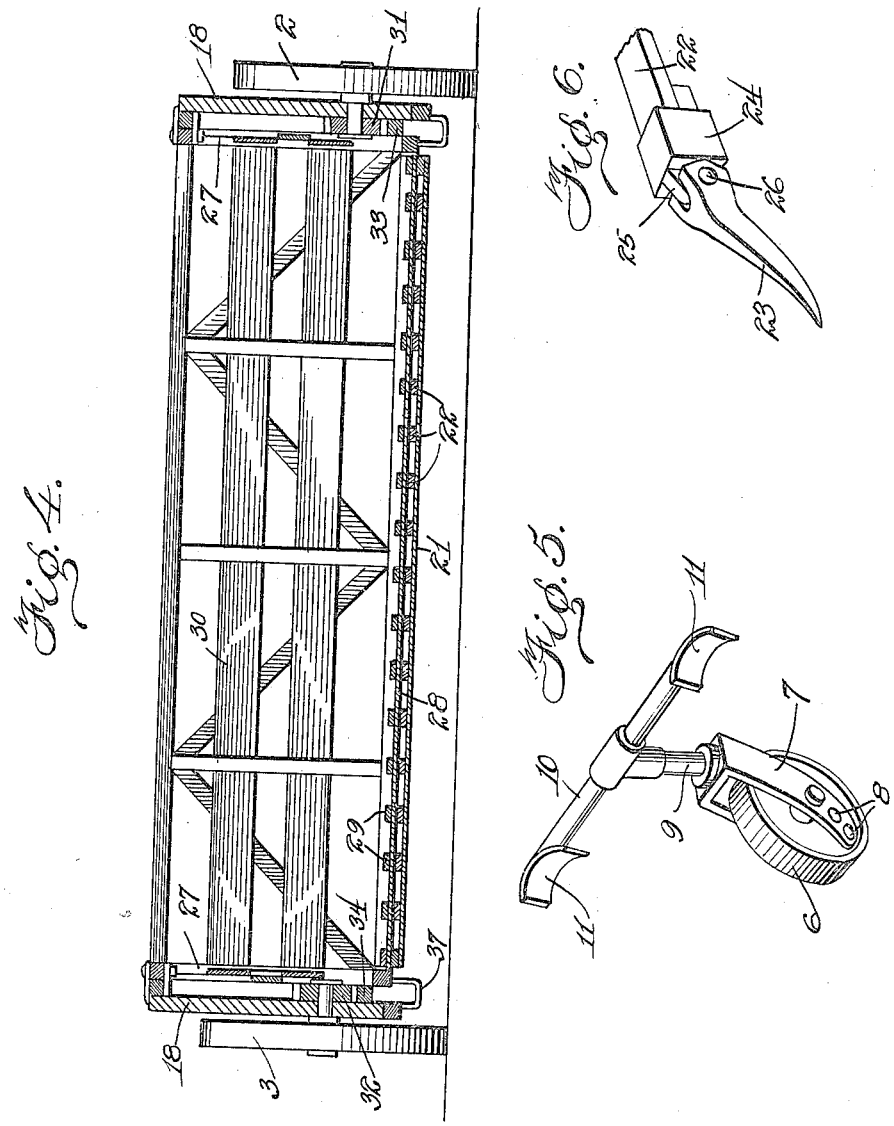

MANASSEH WEBER, OF DIDSBURY, ALBERTA, CANADA.

HAY AND GRAIN SWEEP.

1,254,379.　　　　　Specification of Letters Patent.　　Patented Jan. 22, 1918.

Application filed January 29, 1915, Serial No. 5,120. Renewed June 19, 1917. Serial No. 175,708.

*To all whom it may concern:*

Be it known that I, MANASSEH WEBER, a subject of the King of Great Britain, residing at Didsbury, in the Province of Alberta and Dominion of Canada, have invented certain new and useful Improvements in Hay and Grain Sweeps, of which the following is a specification.

The object of my invention is to provide a sweep which may be used to gather and handle cropped products such as hay and grain in the bulk as it falls to the field after passage of the mower, and to so construct the parts that the operation to load and unload is mechanical and manual labor is not required.

A further object is to so construct the sweep that a considerable quantity of the crop product to be garnered will be collected within the frame thereof by the movement of the machine through the mown field and the machine may then be moved to the point to which the crop is to be conveyed and by a further operation the crop will be discharged from the machine.

Yet another object is to construct the parts which pick the grain or crop product from the field in such a manner that they automatically adjust to irregularities in the surface of the field and insure that the entire crop product is cleaned therefrom, also the parts are so arranged that when the machine has received its full capacity of crop product, this forward end of the machine may be tilted to retain the crop product in place thereon and to prevent accidental displacement and discharge.

With other objects in view, which will be referred to, my invention consists in the peculiar combination and novel arrangement of parts, such as will be hereinafter more fully described in connection with the accompanying drawings and more particularly pointed out in the appended claims.

In the drawings:—

Figure 1 is a view in perspective of my improved sweep with parts broken away more clearly to illustrate the operative structure.

Fig. 2 is a longitudinal vertical sectional view through the machine with the parts in their extended position.

Fig. 3 is a view similar to the disclosure in Fig. 2 with the parts in the contracted relation.

Fig. 4 is a transverse vertical sectional view through the forward part of the machine.

Fig. 5 is a detailed view in perspective of the steering wheel and operating means.

Fig. 6 is an enlarged detailed perspective view to better disclose the structure of one of the gleaning teeth.

The frame 1 of the machine is supported on its forward end by the wheels 2 and 3 which are mounted on each side thereof on the axle 4. A tongue 5 is secured to the frame 1 to extend rearwardly therefrom at a point preferably midway between the sides and a supporting wheel 6 is mounted to carry this tongue and consequently the rear portion of the frame, this supporting wheel 6 being of a proper dimension and so connected that the parts carried thereby are supported in the proper relation with respect to the forward end of the frame carried by the wheels 2 and 3. This supporting wheel 6, the structure of which is better disclosed in Fig. 5, has the yoke 7 in which the wheel proper is mounted provided with a plurality of openings 8 to permit adjustment of the height at which the tongue 5 is supported above the ground over which the wheel is traveling, and the stem 9 of this yoke is pivotally mounted in a bearing formed in the tongue to permit turning movement of the wheel to guide the course of travel of the machine. This stem 9 is provided with a cross pin 10 which has the pedal pieces 11 secured to the end thereof in a position to be accessible to the operator of the machine when riding on the seat 12 which is supported by the tongue 5.

A stationary receiving rack 13 is carried on the forward end of the frame 1 and an extension receiving rack 14 is mounted to have movement with respect to the stationary rack 13 and the frame 1, the coil springs 15 and 16 being connected between these two racks on the opposite side thereof to hold the rack 14 normally in the contracted relation shown in Fig. 3, and the friction rolls 17 are provided to relieve the friction as this rack 14 is moved with respect to the rack 13 or is extended to the relation illustrated in Fig. 2. The rack 13 comprises the side members 18 which are rigidly secured to the frame 1 and the tilting bottom 19 which latter is hinged at 20 or is otherwise connected so that when a full complement of the crops has been gathered into the rack of the machine, this tilting bottom section 19 can be moved in such a relation that the forward end thereof is elevated and the crop is held against falling from the rack or against accidental displacement. The tilting bottom 19 is composed of a sheet 21 having a plurality of slats 22 secured thereon to extend in the direction of the longitudinal extent of the machine and to project slightly at the forward end. The gleaning teeth 23, one of which is better disclosed in Fig. 6, mounted on the projecting end of the slats 22 and extend in advance of the remaining structure of the machine. These gleaning teeth comprise the socket 24 to be secured in any desired manner on the projecting end of the slats 22 and a tenon 25 extends from the forward face of each socket member 24. The teeth 23 are bifurcated at their inner ends to receive the tenon 25 and the bolts or rivets 26 are passed through this bifurcated inner portion of the tooth and through the tenon so that the tooth is hinged in its connection with the socket.

The rack 14 comprises the sides 27 which are arranged to set adjacent the sides 18 of the rack 13, the bottom of this rack 14 comprises a floor 28 which has the slats 29 secured thereon to extend parallel with the slats 22 of the rack 13, and a back 30 is secured between the rear end of the side members 27 to prevent the crop products passing entirely over the rack and from the machine.

The pinions 31 and 32 are secured to revolve with the wheels 2 and 3 respectively and the rack bars 33 and 34 are pivoted at their one end at 35 and 36 to the rack 14 and are held at their free end by the stirrup 37 in such relation that they may be swung up to a position to be engaged by the teeth of the pinions 31 and 32 in such relation that as the machine is moved over the field and the wheels 2 and 3 turn, these rack bars 33 and 34 and consequently the rack 14 will be moved in a forward or rear direction in accordance with the direction of revolution of the pinions 31 and 32. The cables 38 and 39 are wound over pulleys 40 carried by the rack 14 and are connected with the rack bars 33 and 34 in such relation that as a pulling tension is exerted upon these cables the rack bars will be swung to a position to be engaged with the teeth of the pinions 31 and 32, an operating lever 41 being pivoted to the tongue member 5 at a position to be accessible to the operator when riding on the seat 12 and said lever so connected with these cables that the rack bars may be shifted, a segment 42 being provided to hold the operating lever 41 in the position to which it is manually moved.

A cable 43 is wound over the pulleys 44 carried by the racks 13 and 14 and at its one end is connected with an arm 45 secured to the tilting floor or bottom 19 of the rack 13 in such relation that a pulling tension upon this cable will cause the forward edge of the bottom to be raised or tilted to prevent the accidental displacement of the crop products carried by the machine, an operating lever 46 mounted on the tongue 5 at a point to be accessible to the operator having the free end of the cable 43 connected therewith in such relation that a strain to raise the bottom 19 of the rack 13 may be exerted manually and the segment 47 is provided to hold this operating lever 46 in the position to which it is manually adjusted. As a means of propelling the machine over the field, the whiffle trees 48 are mounted to be connected to the tongue 5 to permit the hitching of draft-animals in the rear of the machine and to thus cause the machine to be propelled in front of the draft-animals, the wheel 6 permitting the course of travel of the machine to be directed by the operator.

In use, the racks 13 and 14 will, at the commencement of the operation, occupy the relative position illustrated in Fig. 3, then as the crop product is received within the frame of the machine, the products gathered by the gleaning teeth 23 will force the products already upon the floor 19 of the rack 13 forward onto the floor 28 of the rack 14 and then against the back 30 of this rack. This pressure against the back 30 of the rack 14 will cause this rack 14 to be extended against the tension of the spring 15 and 16, the continued movement of the machine and the subsequent continued gathering of the crop products thereon will cause the rack 14 to be extended to the position indicated in Fig. 2 and the space bounded by the side 18 of the rack 13, the sides 27 of the rack 14 and the back 30 of this same rack to be entirely filled with the crop products, which due to the pressure exerted by the springs 15 and 16 to overcome the extension of the rack 14 will be packed within the rack. The operating lever 46 is then shifted in a rearward direction to exert a drawing tension upon the cable 43 and the bottom 19 of the rack 13 is tilted at its forward end in an upward direction to preclude the possibility of the crop products carried by the machine falling therefrom or becoming accidentally displaced. With the parts in this relation, the machine may be moved to any point at which it is desired to discharge the load, the course of travel of the machine being guided by the operator seated on the seat 12 turning the cross head 10 by which the supporting wheel 6 is turned to guide the machine, and when the desired discharge point has been reached, the lever 41 may be shifted in a rearward direction to raise the rack bars 33 and 34 around their pivotal connection to a point that they engage with the teeth of the pinions 31 and 32 and by backing the draft-animals so that the machine will be moved in a rearward direction, the movement imparted to the wheels 2 and 3 will cause the pinions 31 and 32 to be turned in a direction that the engagement with the teeth of the rack bars 33 and 34 causes the rack 14 to be brought to the contracted position shown in Fig. 3 and this consequent advancement of the back 30 of this rack 14 causes the crop products to be discharged from the forward end of the rack 13, it being of course understood that the operating lever 46 will be again swung to the position that the bottom 19 of this rack is permitted to recede from its elevated position.

From the foregoing it will be seen that I have provided a sweep so constructed that it may be propelled over the field and will garner the cropped products from the uneven surface of the ground and will load this product upon the machine in a somewhat compressed condition thus permitting a considerable quantity to be carried thereby and that the machine may then be adjusted to retain this cropped product in place and may be moved to the point at which it is desired to discharge the material carried by machine therefrom, then by a separate operation of the machine the contents may be discharged without the necessity of manual labor, further it will be seen that the several operating parts thereof are at all times within the control of the operator and that the course of travel of the machine may be guided by this operator.

While I have herein shown and described one specific form of my invention, it will be understood that slight changes might be made in the form and arrangement of several parts without departing from the spirit and scope of my invention, and hence I do not wish to be limited thereto except for such limitations as the claims may import.

I claim:—

1. A sweep comprising supporting wheels, a receiving rack stationarily mounted with respect to said wheels, a second receiving rack movably mounted in telescopic relation with respect to said first mentioned receiving rack and arranged to have the bottom thereof in close contact with the bottom of the first mentioned rack, and means to gather the crop product from the field and place the product in the receiving racks.

2. A sweep comprising supporting wheels, a receiving rack rigidly mounted on said wheels, a second receiving rack movably mounted in telescopic relation with respect to said first mentioned receiving rack and arranged to have the bottom thereof in close contact with the bottom of the first mentioned rack, means to hold said second rack contracted to a position adjacent said first rack and to resiliently permit the extension thereof to allow the receipt of crop product by both of said receiving racks.

3. A sweep comprising supporting wheels, a receiving rack rigidly mounted on said wheels, a second receiving rack movably mounted in telescopic relation with respect to said first mentioned receiving rack and arranged to have the bottom thereof in close contact with the bottom of the first mentioned rack, means to hold said second rack contracted to a position adjacent said first rack and to resiliently permit the extension thereof to allow the receipt of crop product by both of said receiving racks, and mechanical means within the control of the operator to retract said movable rack to its normal position to cause the crop product to be discharged from the sweep.

4. A sweep comprising supporting wheels, a receiving rack rigidly mounted on said wheels, a second receiving rack movably mounted in telescopic relation with respect to said first mentioned receiving rack and arranged to have the bottom thereof in close contact with the bottom of the first mentioned rack, means to hold said second rack contracted to a position adjacent said first rack and to resiliently permit the extension thereof to allow the receipt of crop product by both of said receiving racks, and means connected with said movable rack to be brought to a relation to receive operating impetus from the turning of said wheels to cause retraction of said movable rack to its normal position and to discharge the crop product from the sweep.

5. A sweep comprising supporting wheels, a receiving rack consisting of a bottom and sides stationarily mounted with respect to said wheels, a second receiving rack consisting of a bottom having sides and a back upstanding therefrom telescopically and movably mounted between the sides of said first rack, and means to gather the crop product from the field into said receiving racks.

6. A sweep comprising supporting wheels, a receiving rack consisting of a bottom and sides stationarily mounted with respect to said wheels, a second receiving rack consisting of a bottom having sides and a back upstanding therefrom telescopically and movably mounted between the sides of said first rack, means to gather the crop product from the field into said receiving racks, a spring mounted between said racks to normally hold the telescopically mounted rack contracted with said first rack and arranged to permit extension movement of said second rack as the crop product is gathered by the sweep, toothed wheels mounted to receive movement from said supporting wheels, and toothed rack bars arranged in conjunction with the movably mounted rack to have the teeth of the wheels mesh therewith and to thus cause retraction of said movable rack to discharge the crop product from the sweep.

7. A sweep comprising supporting wheels, a receiving rack consisting of a bottom and sides stationarily mounted with respect to said wheels, a second receiving rack consisting of a bottom having sides and a back upstanding therefrom telescopically and movably mounted between the sides of said first rack, means to gather the crop product from the field into said receiving racks, a spring mounted between said racks to normally hold the telescopically mounted rack contracted within said first rack and arranged to permit extension movement of said second rack as the crop product is gathered by the sweep, toothed wheels mounted to receive movement from said supporting wheels, toothed rack bars arranged in conjunction with the movably mounted rack to have the teeth of the wheels mesh therewith and to thus cause retraction of said movable rack to discharge the crop product from the sweep, said rack bars being pivotally mounted in a position to normally rest with the teeth out of engagement with the teeth of the wheels, and means within the control of the operator to swing said rack bars to the operative position.

In testimony whereof I affix my signature in presence of two witnesses.

MANASSEH WEBER.

Witnesses:
J. M. REED,
G. N. HOWE.

Copies of this patent may be obtained for five cents each, by addressing the "Commissioner of Patents, Washington, D. C."